United States Patent
Kieffel et al.

(10) Patent No.: US 11,056,300 B2
(45) Date of Patent: Jul. 6, 2021

(54) CIRCUIT BREAKER COMPRISING A CERIA-BASED CATALYST FOR CO CONVERSION INTO CO2

(71) Applicant: GENERAL ELECTRIC TECHNOLOGY GMBH, Baden (CH)

(72) Inventors: Yannick Kieffel, Villeurbanne (FR); Louis Maksoud, Villeurbanne (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 16/614,436

(22) PCT Filed: May 16, 2018

(86) PCT No.: PCT/EP2018/062753
§ 371 (c)(1),
(2) Date: Nov. 18, 2019

(87) PCT Pub. No.: WO2018/210936
PCT Pub. Date: Nov. 22, 2018

(65) Prior Publication Data
US 2020/0185171 A1    Jun. 11, 2020

(30) Foreign Application Priority Data

May 18, 2017 (EP) ..................... 17290063

(51) Int. Cl.
H01H 33/22 (2006.01)
H01H 33/74 (2006.01)
H01H 33/78 (2006.01)

(52) U.S. Cl.
CPC ............ H01H 33/78 (2013.01); H01H 33/22 (2013.01); H01H 33/74 (2013.01)

(58) Field of Classification Search
CPC ........ H01H 33/78; H01H 33/74; H01H 33/22; H01H 2033/566; H01H 2033/567; H01H 33/915; H01H 33/56; H02B 13/055; B01D 2255/2065
USPC .................. 218/51, 53, 85, 90, 97; 502/159
See application file for complete search history.

(56) References Cited

U.S. PATENT DOCUMENTS

| 4,864,286 | A | * | 9/1989 | Ohshita | ................ | H01H 1/0015 |
| | | | | | | 340/644 |
| 5,112,787 | A | | 5/1992 | Falke et al. | | |
| 8,304,676 | B2 | * | 11/2012 | Uchii | ..................... | H01H 33/22 |
| | | | | | | 218/53 |
| 8,822,870 | B2 | * | 9/2014 | Mantilla | ................ | H01H 33/22 |
| | | | | | | 218/157 |
| 2003/0099586 | A1 | | 5/2003 | Pugach et al. | | |
| 2004/0175319 | A1 | | 9/2004 | Pugach | | |
| 2007/0056601 | A1 | | 3/2007 | Pillai et al. | | |
| 2011/0217216 | A1 | | 9/2011 | Liu et al. | | |
| 2014/0192454 | A1 | * | 7/2014 | Ashmore | ................ | H02B 5/00 |
| | | | | | | 361/602 |
| 2014/0263187 | A1 | * | 9/2014 | Yamada | ............... | H01H 33/905 |
| | | | | | | 218/63 |
| 2016/0043533 | A1 | * | 2/2016 | Tehlar | ................. | G01N 33/004 |
| | | | | | | 361/618 |
| 2016/0129422 | A1 | | 5/2016 | Weigert et al. | | |

FOREIGN PATENT DOCUMENTS

| JP | 2015073348 | * | 4/2015 | ............. B01J 23/38 |
| JP | 2015073348 A | | 4/2015 | |
| JP | 2016063579 A | | 4/2016 | |
| WO | 20161146197 A1 | | 9/2016 | |
| WO | 20171174496 A1 | | 10/2017 | |

OTHER PUBLICATIONS

Translation JP2016063579 (Original doc published Apr. 25, 2016) (Year: 2016).*
Translation JP2015073348 (Original doc. published Apr. 16, 2015) (Year: 2015).*
International Search Report of PCT/EP2018/062753 dated Aug. 10, 2018.
European Search Report for Application No. 17290063.1 dated Dec. 5, 2017.

* cited by examiner

*Primary Examiner* — William A Bolton
(74) *Attorney, Agent, or Firm* — Eversheds Sutherland (US) LLP

(57) ABSTRACT

A circuit breaker, comprising an enclosure comprising: —at least two arcing contacts that are movable axially relative to each other, between an open position of the circuit breaker in which the arcing contacts are separated from each other and a closed position of the circuit breaker in which the arcing contacts are in contact with each other; and —a gas inlet configured to blow an arc-control gas in order to interrupt an electric arc that is likely to form during movement of the arcing contacts from the closed position to the open position of the circuit breaker, wherein the arc-control gas comprises at least 80% of carbon dioxide; wherein the enclosure further comprises a catalytic material, which converts carbon monoxide that forms after ionization of the carbon dioxide during arcing, into carbon dioxide, said catalytic material comprising ceria and a precious metal.

16 Claims, No Drawings

CIRCUIT BREAKER COMPRISING A CERIA-BASED CATALYST FOR CO CONVERSION INTO CO2

CROSS-REFERENCE TO RELATED APPLICATIONS

This application is a U.S. National Stage Application under 35 U.S.C. 371 and claims the priority benefit of International Application No. PCT/EP2018/062753 filed May 16, 2018, which claims priority to EP17290063.1, filed May 18, 2017, which are both incorporated herein by reference.

TECHNICAL FIELD AND PRIOR ART

The present invention relates to the field of electrical insulation and extinguishing of electrical arcs in medium- and high-voltage devices.

More precisely, it relates to a medium- or high-voltage circuit breaker comprising a ceria-based catalyst material, which converts carbon monoxide that forms during arcing into carbon dioxide.

An arc-blast circuit breaker comprises at least two arcing contacts that are movable axially relative to each other, between an open position of the circuit breaker in which the arcing contacts are separated from each other and a closed position of the circuit breaker in which the arcing contacts are in contact with each other. In circuit breaker, current is typically broken by separating arcing contacts. From the closed position to the open position of the circuit breaker, an electric arc is likely to form between said contacts. In order to interrupt an electric arc, an insulating dielectric gas is blasted onto the arc, thereby making it possible to cool said arc and to extinguish it.

Currently, the most frequently-used arc-control gas for that type of circuit breakers is sulfur hexafluoride $SF_6$ because of the exceptional physical properties of said gas. However, $SF_6$ presents the major drawback of being a very powerful greenhouse gas, with a particularly high global warming potential (GWP).

Among the alternatives to the use of $SF_6$ as an arc-control gas, various gases of global warming potential that is lower than that of $SF_6$ are known, such as dry air or also nitrogen.

A particularly advantageous arc-control gas is carbon dioxide $CO_2$ because of its strong electric insulation and arc-extinction capabilities. Furthermore, $CO_2$ is non-toxic, non-flammable, with a very low GWP, and is also easy to obtain.

$CO_2$ can be used alone or in the form of a gas mixture, of which it constitutes the main gas referred to as "vector gas". For example, the gaseous medium, commonly marketed by Alstom under the name $g^3$ (or 'green gas for green'), a mixture of $CO_2$ (100-x) % with a fluorinated gas x % (x≤10%), is suitable for replacing $SF_6$. The gas mixture presents extinction capabilities that are comparable to, or even better than those of $SF_6$, has little or no effect on the environment (a GWP of 98% lower than the GWP of $SF_6$), a cost that is compatible with its use in manufacturing switchgear on an industrial scale and is non-toxic for humans and animals.

But, and contrary to the $SF_6$ which has the property of recombining after decomposition by arc discharge, $CO_2$ does not recombine completely and namely produces a significant amount of toxic gaseous carbon monoxide CO and carbon powder. Consequently, the quantity of carbon dioxide that is initially present in the gaseous state inside the circuit breaker for breaking electric current reduces as the number of breaks performed by said circuit breaker increases. Therefore, the conversion of CO into $CO_2$ is a key issue.

Various documents describe the CO conversion, mainly, for automobile application. Documents U.S. 2003/0099586, and U.S. 2004/0175319 describe the use of a material comprising gold oxide and iron oxide as a catalyst for oxidizing CO into $CO_2$ in the presence of a large excess of hydrogen. The gas mixture comprises air as a source of oxygen. In document U.S. Pat. No. 5,112,787 a mixture of gold and at least one oxide chosen among iron oxide, cobalt oxide or nickel oxide is used for oxidizing carbon monoxide in air, at temperature below 100° C.

In document U.S. 2011/0217216 a material comprising palladium, ceria and platinum provides conversion of carbon dioxide in exhaust gas, particularly under rich engine operating conditions.

Oxidizing excess of CO in an exhaust gas has also been performed in U.S. 2016/0129422 with a catalyst comprising palladium and a ceria-containing material at a temperature in the range of 100° C. to 700° C.

In U.S. 2007/0056601, a catalyst, for example for cigarette or air filter, comprising gold nanodots on cerium oxide, operates at room temperature.

These documents overall focus on the catalyst material synthesis. Furthermore, although they operate sometimes at relatively low temperatures, they employ oxygen gas (present in the exhaust gas, air filter, cigarette) for the conversion process.

However, in the field of extinguishing electrical arcs, the medium is devoid of oxygen gas.

SUMMARY OF THE INVENTION

The invention aims to propose a circuit breaker comprising a material converting the CO gas into $CO_2$ in an oxygen-free gas mixture, at low temperature (below 100° C.), without harming the gas dielectric properties.

These objects are achieved by the invention that provides a circuit breaker, comprising an enclosure comprising:
- at least two arcing contacts that are movable axially relative to each other, between an open position of the circuit breaker in which the arcing contacts are separated from each other and a closed position of the circuit breaker in which the arcing contacts are in contact with each other,
- a gas inlet configured to blow an arc-control gas in order to interrupt an electric arc that is likely to form during movement of the arcing contacts from the closed position to the open position of the circuit breaker, the arc-control gas comprises at least 80% of carbon dioxide, the enclosure further comprises a catalytic material, which converts carbon monoxide that forms after ionization of the carbon dioxide during arcing, into carbon dioxide, said catalytic material comprising ceria and a precious metal.

It is surprising that ceria is used in an oxygen-free medium. Unexpectedly, it has been discovered that with such a catalytic material, the conversion can be performed even in a medium devoid of oxygen due to the presence of ceria. Ceria plays the role of an oxygen tank reservoir. The conversion mechanism involves the transfer of oxygen from the reducible oxide (ceria), to the precious metal. By reducible oxide, it should be understood an oxide of a metal that can have several oxidation states.

This material enables the neutralization of carbon monoxide even at low temperature (below 200° C., and preferably below 100° C.).

The successful regeneration of the insulating gas maintains its properties and improves its longevity.

This catalyst material is suitable for fitting in a circuit breaker without any increase in its bulk and without any noticeable increase in costs, namely in terms of manufacturing process.

Advantageously, the precious metal is gold or platinum.

Advantageously, the catalytic material comprises 0.5% to 20% by weight of precious metal and preferably 0.5% to 5% by weight. These percentages maximize effectiveness while minimizing cost.

Advantageously, the catalytic material is in the form of particles. This enables to increase the surface area.

Advantageously, the particles have a diameter from 1 mm to 10 mm, preferably from 1 mm to 5 mm. It is relatively easy to obtain such size of particles by conventional and low-cost methods.

According to another embodiment, the catalytic material is supported by a ceramic substrate such as a cordierite substrate. Ceramic substrates have a high thermal resistance, which is suitable for circuit breaker applications.

Advantageously, the arc-control gas is constituted by carbon dioxide $CO_2$.

In a second variant of the invention, the arc-control gas is a gas mixture comprising $CO_2$ and at least a fluorinated compound, such as 2,3,3,3-tetrafluoro-2-(trifluoromethyl)-2-propanenitrile, 1,1,1,3,4,4,4-heptafluoro-3-(trifluoromethyl)-2-butanone, 2,3,3,3-Tetrafluoropropene, 1,3,3,3-Tetrafluoropropene or fluorooxirane.

The catalytic material can be used to convert carbon monoxide in different arc-control gases.

The invention also provides an air-insulated switchgear (AIS) comprising a circuit breaker as defined previously.

The invention also provides a gas-insulated switchgear (GIS) comprising a circuit breaker as defined previously.

The invention can be better understood on reading the additional description given below that relates to a circuit breaker according to the invention.

Naturally, however, this additional description is given merely by way of illustrative example of the invention and is in no way limiting on said invention.

DETAILED DESCRIPTION OF PARTICULAR EMBODIMENTS

The circuit breaker can be a medium- or a high-voltage circuit breaker.

Above and below, the terms "medium voltage" and "high voltage" are used in the conventionally accepted manner, i.e. the term "medium voltage" refers to a voltage that is in the range 7.2 kV to 52 kV, whereas the term "high voltage" refers to a voltage that is in the range 52 kV to 800 kV.

The circuit breaker includes a closed enclosure having a certain number of electrical and/or mechanical components that are housed inside said enclosure. The enclosure is a leak-tight enclosure.

The volume of the enclosure can be from 50 L to 1000 L.

The enclosure comprises a gas inlet that is configured to blow the arc-control gas on the electric arc to extinguish it. The gas can be injected in a nozzle. The enclosure also contains a gas outlet.

The catalytic material is disposed so as to be in contact with the gas flow containing the CO molecules that forms during arcing, and to convert it into carbon dioxide. It can be located close to the arcing contacts.

According to another embodiment, it is located in the gas outlet of the circuit breaker.

The arc-control gas is a dielectric insulating gas.

It contains at least 80% by volume, and preferably, at least 90% by volume of carbon dioxide. For example, it can be a mixture of carbon dioxide (80-100%) and one or more fluorinated compounds (0-20%). Preferably, it is a mixture of carbon dioxide (90-97, preferably 90-96%) and one or more fluorinated compounds (3-10%, preferably 4-10%). For illustrative purpose, the fluorinated compound can be a compound commercialized by Alstom under the name Novec 4710 (2,3,3,3-tetrafluoro-2-(trifluoromethyl)-2-propanenitrile of formula $(CF_3)_2CFCN$) or Novec 5110 (1,1,1,3,4,4,4-heptafluoro-3-(trifluoromethyl)-2-butanone of formula $CF_3C(O)CF(CF_3)_2$). It can also be 2,3,3,3-Tetrafluoropropene (HFO-1234yf), 1,3,3,3-Tetrafluoropropene (HFO-1234ze) or fluorooxirane.

Two fluorinated compounds, such as heptafluoroisobutyronitrile and tetrafluoromethane, could also be used in association.

It should be noted that the catalyst could be used for gases with lower $CO_2$ amount. As long as there is $CO_2$ in the gas mixture, CO can be formed due to arcing in high-voltage circuit breaker, and a CO conversion system is necessary.

According to a further embodiment the gas mixture comprises oxygen. The oxygen can further facilitate the reduction of harmful byproducts. For example, the gas mixture contains at least 80% of a mixture of carbon dioxide and oxygen. Wherein the oxygen content is preferably in the range of 1% to 25%. In another embodiment, the gas could consist of carbon dioxide.

The arc-control gas is oxygen-free. By oxygen-free, it should be understood that the arc-control gas contains less than 0.1% by volume of oxygen gas, and preferably less than 0.02%.

Advantageously, the dielectric insulating gas is present in the equipment in entirely gaseous form whatever the utilization temperature of the equipment. It is therefore advisable for the pressure of the gas inside the equipment to be selected as a function of the saturated vapor pressure (SVP) presented by the gas at the lowest utilization temperature of said equipment.

During arcing, carbon dioxide is ionized into carbon monoxide. The amount of formed CO depends on the physical conditions of the operation and the chemical reaction involved in the process. It varies from few ppm up to few %, from example from 1 ppm to 5%.

Carbon monoxide conversion is achieved using an oxide-based catalyst. Few reducible oxides could be useful for this application, such as $TiO_2$ and $CeO_2$. Ceria $CeO_2$ is the oxide that provides the best avenue for improving the oxygen carrying capacity and redox kinetics.

Ceria ($CeO_2$) is also known as ceric oxide, ceric dioxide, cerium oxide or cerium dioxide. Ceria is used in combination with a precious metal such as gold, palladium, platinum and rhodium. Preferably ceria is used in combination with platinum and/or gold. The precious metal is preferably in the form of particles. Generally, it is disposed at the outer surface of ceria, so as to be in direct contact with carbon monoxide.

Ceria is considered as an oxygen storage material due to its redox properties: Cerium "Ce" in ceria "$CeO_2$" has the ability to switch between the +4 and +3 oxidation states. Consequently, ceria can provide oxygen atoms necessary for the conversion/oxidation of CO. Advantageously the presence of the precious metal at the ceria surface enhances its reducibility.

The global oxidation reaction of CO follows a Mars Van Krevelen mechanism involving the transfer of oxygen from the ceria to the carbon monoxide: $2CeO_2+CO \rightarrow CO_2+Ce_2O_3$.

In more details, on one hand, there is adsorption of CO onto the precious metal surface (platinum for example).

On the other hand, oxygen migrates from the bulk to the ceria surface by diffusion. Oxygen, generated by the ceria support, is also adsorbed onto platinum.

Then separation of $O_2$ into $2O^-$ and oxidation of CO into $CO_2$ occurs on platinum sites implemented over the Ceria surface, following:

$$CO+\tfrac{1}{2}O_2 \rightarrow CO_2.$$

Finally, $CO_2$ desorbs, from the platinum surface.

The catalytic material comprises 0.5% to 20% by weight of precious metal and preferably 0.5% to 5% by weight.

In another embodiment, the catalytic material may comprise one or more additional compounds, for example a metal oxide, and/or a lanthanide. For example, the catalytic material may comprise a metal transition oxide such as $ZrO_2$, which may participate in the soot conversion.

According to another embodiment, the catalytic material consists of the reducible oxide and the precious metal.

Every time an electric arc is extinguished and carbon monoxide is formed, the ceria-based catalyst converts it into carbon dioxide.

Several ceria-based catalysts have been successfully performed and tested using spectroscopy and gas chromatography.

The tests consist in following during hours/days the evolution of the amount of CO (and $CO_2$) within an airtight test cell containing the sample (gas mixture) in contact with the catalyst.

The Ceria based catalysts as previously described are proved to be workable. These materials allow a good conversion of CO gas into $CO_2$ gas and, consequently, excellent arc-control performance by the insulating gas mixture, which performance being long lasting.

The catalytic material can be a powder of catalytic particles. The catalytic particles may have a diameter of few millimeters, from example 1 mm to 10 mm, preferably from 1 mm to 5 mm.

The catalytic material of the present invention may be deposited on any suitable substrate. Advantageously, the substrate presents a high specific surface. For example, the substrate can be a ceramic substrate such as a cordierite substrate comprising a plurality of cells which define fine, parallel gas flow passages extending from one face to the other of a cylindrical monolith member. Such substrate has a "honeycomb" or "monolithic" shape. The honey comb filter is also useful to trap the carbon powder. The ceramic substrate could also be an aluminosilicate substrate.

Alternatively, the catalytic material can be dispersed on a particulate support, such as pellets or particles or the like.

According to a preferred embodiment, the catalytic material has a cordierite honeycomb support. This support presents excellent thermal shock resistances. Additionally, cordierite crystals are useful for very low thermal expansion along one axis within the catalyst.

The circuit breaker according to the invention has a compact structure.

When an electric arc is formed, a portion of the fraction of $CO_2$, which is present in the gaseous state inside the enclosure, is broken down into molecular species of smaller molecular mass and, therefore, of smaller size than $CO_2$. This has the effect of raising the total pressure that exists inside the enclosure, while lowering the partial pressure of the $CO_2$ to below its SVP.

The carbon monoxide molecules thus formed in this way in the circuit breaker of the invention are converted into $CO_2$ by the catalytic material, and this has the effect of returning the partial pressure of $CO_2$ to a value equal to its SVP.

This catalytic material is efficient enough so that the formation of carbon monoxide does not result in an excessive increase in the total pressure that exists in the enclosure and, therefore, does not result in an excessive reduction of the fraction of carbon dioxide that is present in the gaseous state in said enclosure.

Using this mechanism, the volume of $CO_2$ can be held stable or quasi-stable, for a given temperature, regardless of the number of breaks performed by the switchgear.

The man skilled in the art will be able to select the appropriate amount of ceria based catalyst material according to the volume of CO gas to be treated and to the geometry of the involved enclosure. For example, the Ceria amount is calculated as function of the potential amount of CO formed within the circuit breaker after arcing simulated over the circuit breaker lifetime. It depends on the energy of arcing and so on the circuit breaker type. For illustrative purpose, maintenance can be expected every 20 years, during which the circuit breaker is opened and the catalyst may then be replaced by a new one if necessary.

The concepts of the various embodiments described above can be effectively applied to various kinds of circuit breaker, such as for example circuit breakers with an interruption chamber of the axial- or transverse-blast type or of the mixed transverse-axial blast type.

For illustrative purposes, the circuit breaker can be used in any electrical device employing CO2 gas electric insulation, namely an electrical transformer, an electricity transporting or distributing line, a set of busbars, a switch, a connector/disconnector (also called switchgear), a unit combining a circuit breaker with fuses, a grounding switch, or a contactor.

The circuit breaker is particularly valuable for air-insulated switchgear (AIS) or gas-insulated switchgear (GIS), and more preferably for high-voltage AIS or GIS.

The invention claimed is:

1. A circuit breaker, comprising an enclosure comprising:
   at least two arcing contacts that are movable axially relative to each other, between an open position of the circuit breaker in which the arcing contacts are separated from each other and a closed position of the circuit breaker in which the arcing contacts are in contact with each other,
   an inlet to the enclosure, the inlet configured to blow an arc-control gas in order to interrupt an electric arc that is likely to form during movement of the arcing contacts from the closed position to the open position of the circuit breaker, the arc-control gas being oxygen-free, comprising at least 80% of carbon dioxide, wherein the arc-control gas is a gas mixture comprising $CO_2$ and at least one fluorinated compound, wherein the arc-control gas comprises from 90 to 97% by volume of carbon dioxide and from 3 to 10% by volume of the at least one fluorinated compound,
   wherein the enclosure is at least below 100° C., further comprising a catalytic material, which converts carbon monoxide that forms after ionization of the carbon dioxide during arcing, into carbon dioxide, the catalytic material comprising ceria and a precious metal, and the catalytic material being supported by a substrate comprising a ceramic substrate.

2. The circuit breaker according to claim 1, wherein the precious metal is gold.

3. The circuit breaker according to claim 1, wherein the precious metal is platinum.

4. The circuit breaker according to claim 1, wherein the catalytic material comprises 0.5% to 20% by weight of precious metal.

5. The circuit breaker according to claim 1, wherein the catalytic material is comprised of particles.

6. The circuit breaker according to claim 5, wherein the particles have a diameter from 1 mm to 10 mm.

7. The circuit breaker according to claim 6, wherein the particles have a diameter from 1 mm to 5 mm.

8. The circuit breaker according to claim 1, wherein the catalytic material is supported by a cordierite substrate.

9. The circuit breaker according to claim 1, wherein the catalytic material comprises a metal oxide.

10. The circuit breaker according to claim 9, wherein the metal oxide is $ZrO_2$.

11. The circuit breaker according to claim 1, wherein the catalytic material comprises a lanthanide.

12. The circuit breaker according to claim 1, wherein the arc-control gas is constituted by carbon dioxide ($CO_2$).

13. The circuit breaker according to claim 1, wherein the at least one fluorinated compound is chosen among 2,3,3,3-tetrafluoro-2-(trifluoromethyl)-2-propanenitrile, 1,1,1,3,4,4,4-heptafluoro-3-(trifluoromethyl)-2-butanone, 2,3,3,3-Tetrafluoropropene, and 1,3,3,3-Tetrafluoropropene or fluorooxirane.

14. An air-insulated switchgear (AIS) comprising the circuit breaker as defined in claim 1.

15. A gas-insulated switchgear (GIS) comprising the circuit breaker as defined in claim 1.

16. A circuit breaker, comprising an enclosure comprising:
   at least two arcing contacts that are movable axially relative to each other, between an open position of the circuit breaker in which the arcing contacts are separated from each other and a closed position of the circuit breaker in which the arcing contacts are in contact with each other,
   an inlet to the enclosure, the inlet configured to blow an arc-control gas in order to interrupt an electric arc that is likely to form during movement of the arcing contacts from the closed position to the open position of the circuit breaker, the arc-control gas being oxygen-free, comprising at least 80% of carbon dioxide,
   wherein the enclosure is at least below 100° C., further comprising a catalytic material, which converts carbon monoxide that forms after ionization of the carbon dioxide during arcing, into carbon dioxide, the catalytic material comprising ceria and a precious metal;
   wherein the arc-control gas is a gas mixture comprising $CO_2$ and at least one fluorinated compound; and
   wherein the arc-control gas comprises from 90 to 97% by volume of carbon dioxide and from 3 to 10% by volume of the at least one fluorinated compound.

* * * * *